3,354,103
SEQUESTERING ION EXCHANGE RESINS WHICH ARE POLYIMINE REACTION PRODUCTS
Le Roy A. White, Root Road, Somers, Conn. 06071
No Drawing. Filed Apr. 6, 1964, Ser. No. 357,737
9 Claims. (Cl. 260—2.2)

This is a continuation-in-part of application Ser. No. 765,924 filed Oct. 8, 1958 and now abandoned without prejudice.

The present invention relates to ion exchange resins and, more particularly, insoluble cross-linked ion exchange sequestering resins formed by the reaction between a polyimine, a halogenated acid, and a cross-linking agent for a polyamine.

Ion exchange resins are known and are commercially available for a variety of uses. Many commercial operations require water or water solutions which are substantially free of trivalent cations, such as ferric ions; monovalent cations, such as sodium, however, are often not objectionable in such operations. The prior art methods of removing multivalent cations from aqueous solutions embody the following materials:

(1) Sulfated or carboxylated insoluble resins;
(2) Inorganic siliceous materials;
(3) Sequestering agents.

These materials suffer from the following defects:

(1) Sulfated and carboxylated insoluble resins, such as sulfated styrene/divinyl benzene copolymers, sulfated coal and crosslinked polyacrylic acid, indiscriminately remove all cations from solution rather than selectively removing only the multivalent cations. Unnecessary removal of monovalent ions causes the unnecessary expense of regenerating the ion exchange resin more frequently than would be required if only the multivalent ions were removed.

(2) Inorganic siliceous materials, such as zeolites, do not in general suffer from the aforementioned defect. However, their efficiency in preferentially removing multivalent ions is not sufficiently high to justify their use in many processes where they have other disadvantages, e.g., silicates are not used in metals purification procedures since any attempt to leach out absorbed metals will usually destroy the silicate. In addition, the inorganic siliceous materials are readily soluble in water unless the pH is carefully controlled and thus cause procedural difficulties.

(3) Sequestering agents, such as ethylene diamine tetra-acetic acid, are useful in many operations where it is necessary to remove multivalent cations. However, such sequestering agents are preferably not used in the manufacture of beverages, such as wine or beer, to prevent the formation of precipitates caused by multivalent cations, since the sequestering agents effectively remove calcium from teeth. Also, where the multivalent cations can enter into chemical reactions, the sequestering agents are of limited effectiveness because they will continuously release the cation to maintain the reaction equilibrium as the cations in solution are consumed.

It is, therefore, an object of this invention to provide ion exchange resins which will remove multivalent cations from solutions in preference to monovalent ions.

It is another object to produce ion exchange resins which comprise a chelating molecule attached to a nitrogen-containing polymer by connection to the nitrogen in the polymer chain.

It is another object of the present invention to provide a simple, convenient and effective method of synthesis of a sequestering ion exchange resin.

It is another object to produce insoluble resins having far greater affinity for multivalent ions than for monovalent ions which do not suffer from the defects of the prior art, such as those mentioned above.

It is another object of the present invention to increase the tenacity of resin multivalent cation bonding.

It is another object of the present invention to provide an ion exchange sequestering agent having acidic chelating constituents.

It is another object of the present invention to provide an ion exchange resin having chelating constituents oriented about the multivalent ion before crosslinking.

These and other objects and the nature and advantages of the present invention will be apparent from the following description.

The objects of this invention are attained by attaching acidic chelating constituents to a polyimine at the nitrogen atom in the chain and then crosslinking, preferably in the presence of multivalent ions, to orient the chelating constituents around the multivalent ion and increase the tenacity of the resin-multivalent cation bond.

The ion exchange chelating resins are obtained by reacting: (A) a polyimine of the general formula:

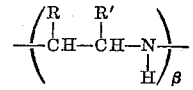

(B) a metal-replacable-hydrogen containing organic compound, such as an organic acid or phenolic material, of one or more of the following compounds:

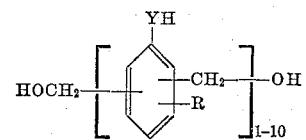

such as a condensate of phenol and formaldehyde

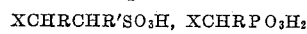

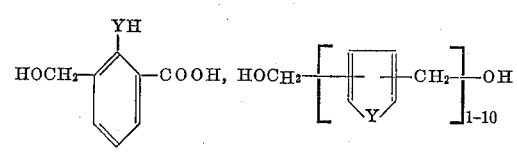

preferably reacted with 2–99% of the available NH groups, preferably a halogenated acid; and (C) a crosslinking agent for a polyimine preferably reacted with 2–50% of the available NH groups.

In the above formulae R and R' are selected from the group consisting of —H, —F, —CH$_2$OH,

—(CH$_2$)$_{0-5}$CH$_3$, —C(CH$_3$)$_3$, —CH(CH$_3$)$_2$
—CH$_2$CH(CH$_3$)$_2$

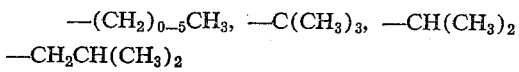

and

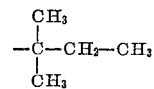

X is selected from the group consisting of Cl, Br, and I; Y is selected from the group consisting of S and O; and β is an integer of at least 5.

The crosslinking agents need not have the affinity for metals which hydroxyl or thiol compounds have, but sequestering ability of the resin is enhanced by selection of a crosslinking agent having sequestering ability. Thus, epoxy crosslinking agents such as polybisphenol diepoxides, epichlorohydrin, epibromohydrin, and epoxidized resorcinol - formaldehyde condensation product; polyisothiocyanates, such as hexamethylene diisothiocyanate and benzene diisothiocyanate; sulfones, such as divinyl sulfone and dihydroxy ethyl sulfone; aldehydes, such as glutaraldehyde, glyoxal and dimethylol thiourea; phenolic crosslinking agents, such as phenol-formaldehyde condensation products, salicylic acid-formaldehyde condensation products, and thiophenol - formaldehyde condensation products; ethers, such as furfuraldehyde, furfural-formaldehyde condensation products, and thiophene-formaldehyde condensation products; and mercapto crosslinking agents, such as 4,6 - diamino, 2 - thiocyanuric acid - formaldehyde condensation products all promote sequestering in the resin.

On the other hand, other crosslinking agents for polyamines can also be used. Thus, halogenated hydrocarbons, such as dibromo ethane, dichloro ethane, and tribromo octane; polyisocyanates, such as hexamethylene diisocyanate, toluene diisocyanate, toluene diisocyanate dibisulfite, and polymethylene phenyl isocyanate (PPI); aniline - aldehydes, such as aniline - formaldehyde and dimethyl aniline - acetaldehyde; and melamine - aldehydes, such as hexamethylol melamine and 2 - ethoxy-4,6 - diamino - s - triazine - formaldehyde may also be used, but these crosslinking agents have little, if any, effect on the sequestering properties of the resin.

The preferred polyimine for use in the preparation of the ion exchange sequestering agent is polyethylenimine. However, if it is desired to decrease the water sensitivity of the sequestering resin, more hydrophobic polyamines may be used, e.g.

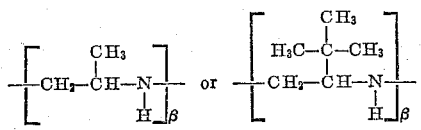

Although the preferred metal - replacable - hydrogen containing organic compounds utilized are halogenated carboxylic, sulfuric, or phosphonic acids, such as chloracetic acid, the use of phenolic materials, e.g., trimethylol phenol or methylol salicylic acid, with or instead of the halogenated acids, results in sequestering resins having a surprisingly greater affinity for ions of metals such as iron and uranium. Also, the use of mercaptan compounds with or instead of the halogenated acids yields resins having a very good affinity for copper ions, but such resins must be protected from oxidation.

EXAMPLE 1

As an example, 42 grams of 50% polyethylenimine having a molecular weight of from 30,000 to 40,000 were reacted with 37.8 grams chloracetic acid dissolved in NaOH. The NaOH was added as required to maintain the pH at 10. Next, 10 grams (Calc.) of precipitated $Cu(OH)_2$ were added to the resin slurry. The slurry was then heated and cooled. Next, 4.0 grams of epichlorohydrin were added and the mixture was stirred and heated until gelled. The gel was evaporated and the resultant bluish sequestering resin was ground and extracted with 25% HCl. The resin was washed with water and with excess $CuSO_4$ solution thereby turning it blue again. The resin was washed with water and soaked in distilled water. No copper ion leached into the water phase thereby indicating an improvement over polyimine resins prepared without the benefit of acid groups to simulate a monomeric sequestering unit.

As a control, 10 grams of 50% polyethylenimine solution and 1 gram of 25% gluteraldehyde solution were mixed and heated to evaporate the water. The resin was chopped in a Waring Blendor, washed with 2 N NaOH and then with distilled water. 10 cc. of the resin containing 0.56 gram dried solids was found to take up 2.1 milliequivalents of ferric ion (or 3.77 milliequivalents per gram). A washed resin aliquot was found to absorb cupric ion readily, turning the resin blue. After washing with water it was found the blue resin, however, would leach some cupric ion back into solution.

Thus it is seen that by utilizing a metal - replaceable-hydrogen containing organic compound, such as the halogenated acid chloracetic acid, the sequestering resin, saturated with metallic ions, will not release the ions to the solution.

EXAMPLE 2

The same procedure as that utilized in Example 1 is followed except that 20 grams of chloracetic acid and 17.8 grams of $ClCH_2PO_3H_2$ is substituted for the 37.8 grams of chloracetic acid in Example 1. Results similar to those of Example 1 are obtained.

EXAMPLE 3

The procedure of Example 1 is again followed except that 20 grams of phenol-formaldehyde is substituted for the 4 grams of epichlorohydrin used in Example 1. Results similar to those of Example 1 are obtained.

EXAMPLE 4

The procedure of Example 1 is carried out except that 60 grams of

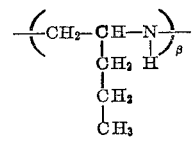

is substituted for the 42 grams of polyethylenimine; 40 grams of

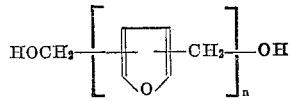

is substituted for the 37.8 grams of chloracetic acid; and 10 grams of hexamethylene diisothiocyanate is substituted for the 4 grams of epichlorohydrin. A superior ion exchange sequestering resin is again obtained. The value of $n$ in the above formula varies from molecule to molecule but is believed to average 3–5; any value between 1 and 10 is satisfactory.

EXAMPLE 5

As an alternate procedure, 40 grams of

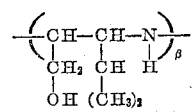

are reacted with 40 grams of

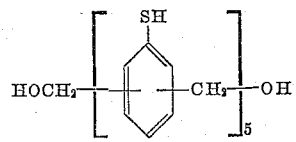

and 5 grams of $BrCHCH_3CH_2PO_3H_2$ dissolved in NaOH maintained at a pH of 10. The resin was then crosslinked with glyoxal. An excellent ion exchange resin was obtained having chelating properties intermediate that of the control and the product of Example 1.

EXAMPLE 6

Following the procedure of Example 1, 45 grams of

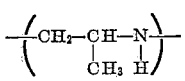

are used in place of the polyethylenimine; 45 grams of

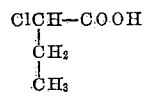

are used in place of the chloracetic acid; and 5 grams of divinyl sulfone are used as a crosslinking agent in place of the epichlorohydrin. A sequestering resin having properties comparable to that of Example 1 is obtained.

It will be obvious to those skilled in the art that various changes may be made without departing from the spirit of the invention and therefore the invention is not limited to what is shown and described in the specification, but only as indicated in the appended claims.

What is claimed is:

1. A crosslinked sequestering resin comprising the reaction product of:
   (A) a polyimine consisting essentially of units of the formula

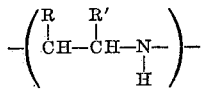

(B) a metal-replaceable-hydrogen containing organic compound selected from the group consisting of:

$XCHRCOOH$, $XCHRPO_3H_2$

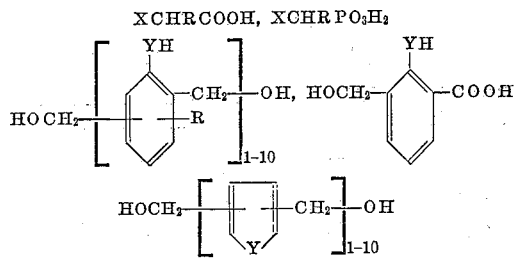

and mixtures thereof; and
   (C) a crosslinking agent for a polyamine selected from the soluble amine reactive group consisting of epoxy crosslinking agents, polyisothiocyanates, sulfones, aldehydes, phenolic condensation products, ethers, mercapto crosslinking agents, halogenated hydrocarbons, polyisocyanates, aniline-aldehyde condensation products, and melamine-aldehyde condensation products; wherein R and R' are selected from the group consisting of —H, —F, —$C_mH_{2m+1}$,

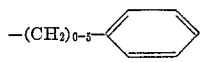

and —$CH_2OH$, wherein $m$ is an integer of 1–5; X is selected from the group consisting of Cl, Br, and I; and Y is selected from the group consisting of S and O.

2. A crosslinked sequestering resin in accordance with claim 1 wherein said metal-replaceable-hydrogen containing compound is attached at 2–98% of the available NH groups in said polyimine and said crosslinking agent is attached at 2–50% of said available NH groups.

3. The method of forming an insoluble, crosslinked sequestering agent comprising reacting:
   (A) a polyimine consisting essentially of units of the formula

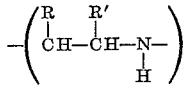

(B) a metal-replaceable-hydrogen containing organic compound including acid, —OH or —SH groupings and selected from the group consisting of

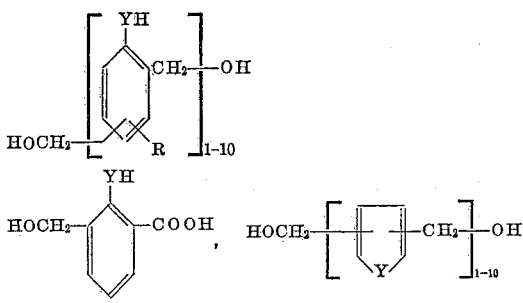

and mixtures thereof; and
   (C) a crosslinking agent for a polyamine selected from the soluble amine reactive group consisting of epoxy crosslinking agents, polyisothiocyanates, sulfones, aldehydes, phenolic condensation products, ethers, mercapto crosslinking agents, halogenated hydrocarbons, polyisocyanates, aniline-aldehyde condensation products, and melamine-aldehyde condensation products; said reaction being carried out in the presence of one multivalent cation for every 2–4 of said acid, —OH, and —SH groupings; wherein —R and —R' are selected from the group consisting of —H, —F, —$C_mH_{2m+1}$,

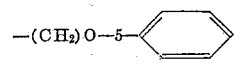

and —$CH_2OH$, wherein $m$ is an integer of 1–5; X is selected from the group consisting of Cl, Br, and I; and Y is selected from the group consisting of S and O.

4. The insoluble reaction product of polyethylenimine, chloracetic acid, and epichlorohydrin.

5. The method of forming an insoluble crosslinked ion exchange sequestering agent comprising reacting polyethylenimine, chloracetic acid and epichlorohydrin.

6. A crosslinked sequestering resin comprising the reaction product of:
   (A) a polyimine consisting essentially of units selected from the group consisting of

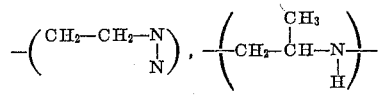

and

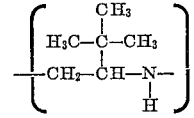

(B) a metal-replaceable-hydrogen containing organic compound selected from the group consisting of

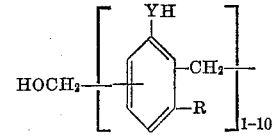

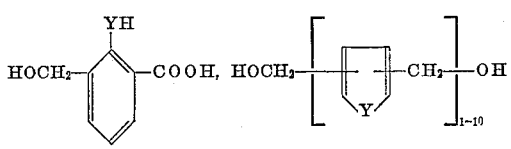

and mixtures thereof; and
   (C) a crosslinking agent for a polyamine, selected from the soluble amine reactive group consisting of epoxy crosslinking agents, polyisothiocyanates, sulfones, aldehydes, phenolic condensation products, ethers, mercapto crosslinking agents, halogenated hydrocarbons, polyisocyanates, aniline-aldehyde condensation products, and melamine-aldehyde condensation products wherein R and R' are selected from the group consisting of —H, —F, —C$_m$H$_{2m+1}$,

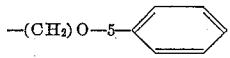

and —CH$_2$OH, wherein $m$ is an integer of 1–5; X is selected from the group consisting of Cl, Br, and I; and Y is selected from the group consisting of S and O.

7. The method of forming an insoluble, crosslinked sequestering agent comprising reacting:
(A) a polyimine consisting essentially of units selected from the group consisting of

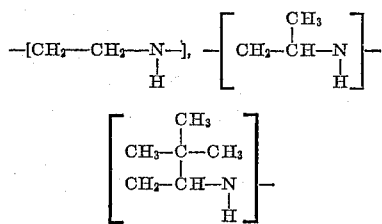

(B) a metal-replaceable-hydrogen containing organic compound including acid, —OH or —SH groupings and selected from the group consisting of

XCHRCOOH

XCHRPO$_3$H$_2$,

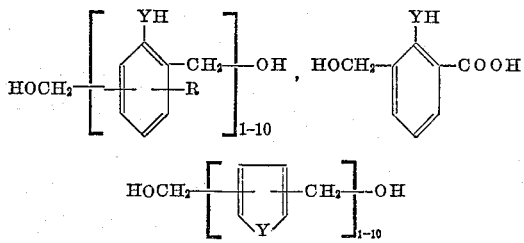

and mixtures thereof; and (C) a crosslinking agent for a polyamine selected from the soluble amine reactive group consisting of epoxy crosslinking agents, polyisothiocyanates, sulfones, aldehydes, phenolic condensation products, ethers, mercapto crosslinking agents, halogenated hydrocarbons, polyisocyanates, aniline-aldehyde condensation products, and melamine-aldehyde condensation products; said reaction being carried out in the presence of one multivalent cation for every 2–4 of said acid, —OH, and —SH groupings; wherein —R and —R' are selected from the group consisting of —H, —F, —C$_m$H$_{2m+1}$,

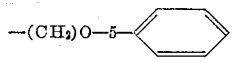

and —CH$_2$OH, wherein $m$ is an integer of 1–5; X is selected from the group consisting of Cl, Br, and I; and Y is selected from the group consisting of S and O.

8. The insoluble reaction product, for sequestering iron and uranium, of polyethylenimine; a metal-replaceable-hydrogen containing organic compound selected from the group consisting of trimethylol phenol, methylol salicylic acid, mixtures thereof, and mixtures with chloracetic acid; and epichlorohydrin.

9. The insoluble reaction product, for sequestering copper ions, of polyethylenimine; 4,6-diamino-2-thiocyanuric acid-formaldehyde condensation product or mixtures thereof with chloracetic acid; and epichlorohydrin.

References Cited
UNITED STATES PATENTS

| | | | |
|---|---|---|---|
| 2,753,372 | 7/1956 | Lundberg | 260—2 |
| 3,228,920 | 1/1966 | D'Alelio | 260—2 |

FOREIGN PATENTS

| | | |
|---|---|---|
| 562,620 | 9/1958 | Canada. |
| 466,344 | 5/1937 | Great Britain. |

WILLIAM H. SHORT, *Primary Examiner.*

M. GOLDSTEIN, *Assistant Examiner.*

UNITED STATES PATENT OFFICE
CERTIFICATE OF CORRECTION

Patent No. 3,354,103                                   November 21, 1967

Le Roy A. White

It is hereby certified that error appears in the above numbered patent requiring correction and that the said Letters Patent should read as corrected below.

Column 6, lines 47 to 49, the left-hand formula should appear as shown below instead of as in the patent:

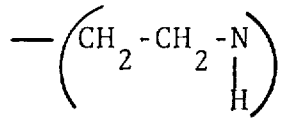

same column 6, lines 61 to 66, the formula should appear as shown below instead of as in the patent:

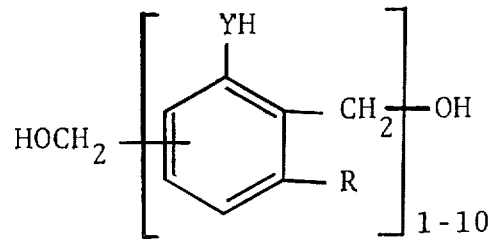

Signed and sealed this 14th day of January 1969.

(SEAL)
Attest:

EDWARD M. FLETCHER, JR.                         EDWARD J. BRENNER
Attesting Officer                               Commissioner of Patent